United States Patent [19]
Betts et al.

[11] 4,390,843
[45] Jun. 28, 1983

[54] TELEPHONE SYSTEM RING PERIOD DETECTOR

[75] Inventors: William L. Betts, Maderia Beach; Kenneth Martinez, Pinellas Park, both of Fla.

[73] Assignee: Paradyne Corporation, Largo, Fla.

[21] Appl. No.: 232,703

[22] Filed: Feb. 9, 1981

[51] Int. Cl.³ .............................................. H03K 9/08
[52] U.S. Cl. .................... 328/138; 328/111; 328/129.1; 179/1 P
[58] Field of Search ................ 328/111, 138, 140, 129

[56] References Cited
U.S. PATENT DOCUMENTS 3,825,842  7/1974  Birchfield et al. .................. 328/138
3,958,183  5/1976  Schaefer ............................. 328/138
3,999,136  12/1976 O'Berry et al. ..................... 328/138
4,047,114  9/1977  Lane et al. .......................... 328/140
4,232,267  11/1980 Hanajima et al. .................... 328/138

Primary Examiner—John S. Heyman
Attorney, Agent, or Firm—Kane, Dalsimer, Kane, Sullivan and Kurucz

[57] ABSTRACT

An improved ring detector circuit is provided to discriminate between ring signals and low frequency dial signals. The circuit times the interval between pulses generated each time the incoming waveform exceeds a threshold and, if the interval is greater than 50 ms disables a ring detect circuit which is set by a pulse train, the interval between adjacent pulses of which is less than 50 ms. Pulses having a duration of less than 5 ms are eliminated to insure that chatter and sliver are not misconstrued as a ring signal.

4 Claims, 1 Drawing Figure

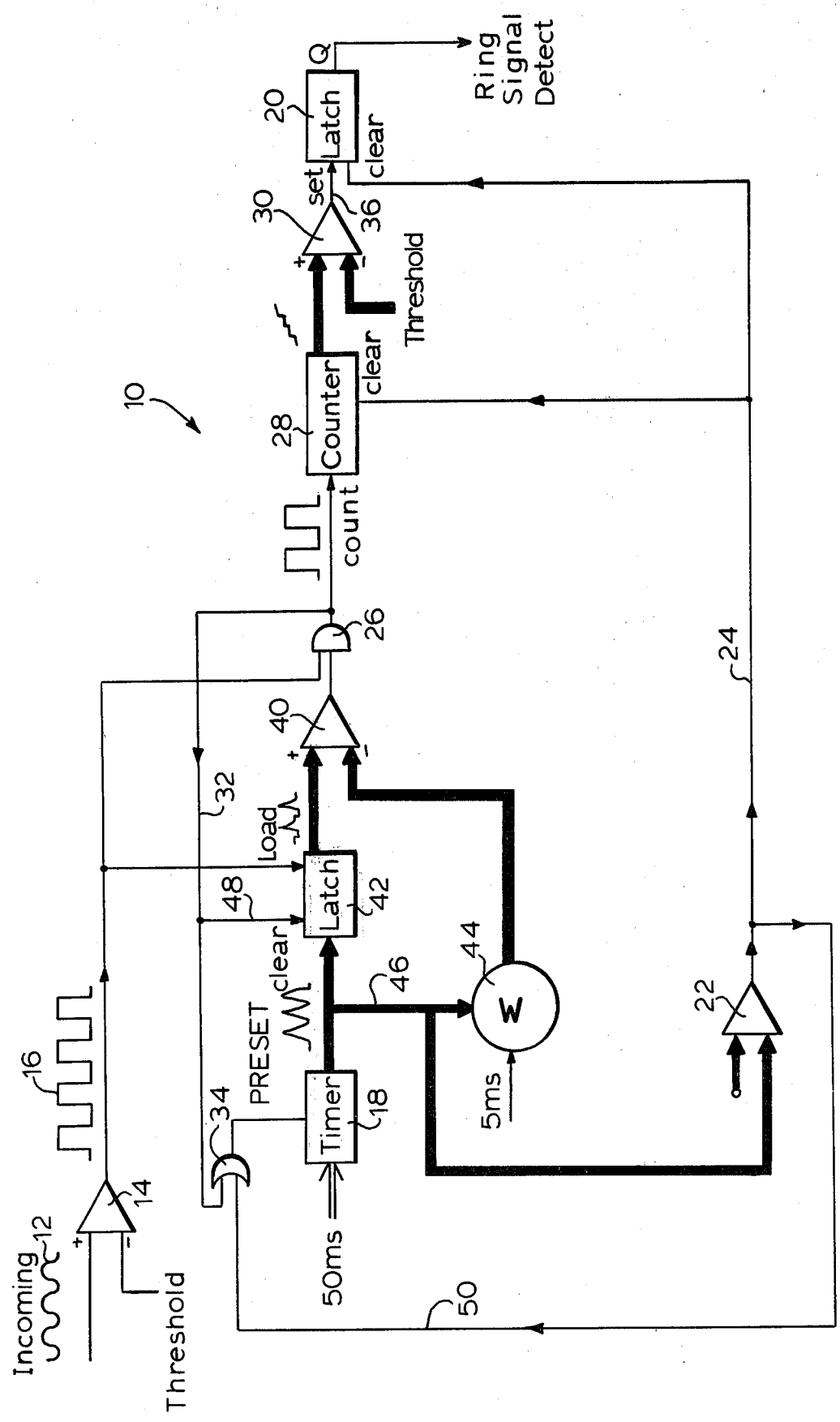

TELEPHONE SYSTEM RING PERIOD DETECTOR

BACKGROUND OF THE INVENTION

The present invention relates to telephone equipment and in particular to an improved ring period detector circuit.

Telephone equipment, such as modems, commonly include circuits which provide automatic telephone answering options. These circuits utilize a ring signal detector to detect an incoming call and automatically respond in accordance with some preselected format.

Ring signals are generally in the 22.5 Hz to 55 Hz frequency range. A problem arises in that certain dial pulses are in the 10 Hz to 18 Hz frequency range and hence are sufficiently close in frequency to the ring signals that they may be confused as ring signals.

In view of the above, it is a principal object of the present invention to provide an improved ring signal detection circuit which can discriminate ring signals with a high degree of precision over other low frequency signals.

A further object is to provide such a circuit which utilizes conventional components and may readily and economically be implemented into other telephone system components.

Still further object will become apparent from the following description of the invention.

SUMMARY OF THE INVENTION

The above and other beneficial objects and advantages are obtained in accordance with the present invention by providing an improved circuit for discriminating ring signal waveforms from other low frequency waveforms. The circuit includes detecting means having an input for receiving an incoming waveform signal and adapted to produce a train of output pulses each pulse having a width corresponding in time to the time the waveform exceeds a threshold. The circuit further includes a free running timer adapted to count down from 50 ms, a time less than the period of the lower frequency waveform signal but greater than the period of the higher frequency signal. First circuit means interconnect the output of the timer with a "CLEAR" input of a latch and are adapted to clear the latch each time the timer comes down to zero. A second circuit interconnects a "SET" input of the latch with the waveform detecting circuit output so that the output pulse train sets the latch to produce a ring detect signal. A third circuit interconnects the waveform detecting circuit output with a "PRESET" input to the timer so that each pulse of the pulse train can preset the timer to restart its down count. In order to prevent noise or chatter from being misconstrued as a ring signal, circuit means are provided to exclude all pulses of less than 5 ms from setting the latch.

BRIEF DESCRIPTION OF THE DRAWING

The accompanying drawing is a simplified block diagram of the circuit of the present invention.

DETAILED DESCRIPTION OF THE PREFERRED EMBODIMENT

Reference is now made to the drawings and to FIGURE in particularly wherein a detector circuit 10 in accordance with the present invention is depicted. An incoming waveform 12 is fed to a comparator 14 the other input of which comprises a threshold value which, for telephone equipment may be on the order of 15 volts. The output of comparator 14 is a pulse train 16. For purposes of distinguishing between ring signals (of 22.5 Hz-55 Hz) and low frequency dial pulse signals (of between approximately 10 Hz-18 Hz) the time interval between adjacent pulse of pulse train 16 should be less than 50 ms. That is, if the time interval between adjacent pulses exceeds 50 ms, then the incoming wave 12 may be considered a low frequency dial pulse and ring signal detection is disabled. To make the discrimination, a countdown timer 18 is provided. Timer 18 freely runs from a present level corresponding to 50 ms to zero. Each time the timer reaches zero a disabling pulse to latch 20 is generated. To this end, the output of timer 18 is fed to a comparator 22 the other input of which corresponds to zero time level. Accordingly, each time timer 18 counts down to zero, comparator 22 produces an output signal on line 24 which is fed to the CLEAR input of latch 20. Pulses from comparator 14 are also fed to the SET input of latch 20 through a circuit which includes gate 26, counter 28 and comparator 30. Thus, latch 20 will remain set so long as gate 26 is enabled and other conditions to be discussed forthwith exist. The output of gate 26 is also fed through line 32 and OR gate 34 to the PRESET terminal of timer 18. Thus, each output of gate 26 serves to reset timer 18 to 50 ms and restart the down counting process thereby preventing the timer from counting down to zero on that particular cycle.

A valid pulse train is detected by counting each pulse that exceeds 5 ms in duration in order to avoid misconstruing slivers or chatter from comparator 14 as part of a ring signal pulse train. To this end, the pulse train 16 output of comparator 14 is fed to gate 26 and then to correlation counter 28. The output of counter 28 is compared in comparator 30 with a threshold determined by the frequency of the anticipated ring waveform (typically a threshold of 5-8). When this threshold is exceeded, comparator 30 generates a pulse on line 36 to set latch 20. Latch 20 remains set until it is cleared by virtue of a pulse from comparator 22 indicating that the 50 ms time limit has been exceeded by a pulse interval.

Pulses of less than 5 ms from comparator 14 are excluded via comparator 40, the output of which is required to enable gate 26. To this end, the pulse train output of comparator 14 is used to permit latch 42 to load the timer value of timer 18 whenever the pulse train 16 is low. When the pulse train waveform is high, latch 42 remembers the previous timer value although the timer continues to decay. An adder 44 is connected through line 46 to the output of timer 18. Adder 44 serves to add a value equivalent to 5 ms to the timer value from timer 18, the output of which is compared in comparator 40. Thus, comparator 40 serves to compare the timer value when its output pulse rising edge first occurs. After 5 ms, the comparator 40 would generate a pulse which, through gate 26, line 32 and gate 34 will preset the 50 ms timer to 50 ms and also clear the latch 42 through line 48. The output of gate 26 also increments the counter 28 building the output until it exceeds the threshold value of comparator 30 thereby producing an output signal to set latch 20 indicating that a ring signal has been detected. The latch 20 remains set until cleared by an output from comparator 22 indicating that a pulse interval greater than 50 ms has been detected. Each output of comparator 22 also serves to present timer 18 through line 50.

Thus, in accordance with the above, the aforementioned objects are attained.

Having thus described the invention, what is claimed is:

1. A circuit for differentiating a first waveform signal from a second waveform signal of lower frequency comprising:

detecting circuit means having an input for receiving an incoming waveform signal and producing a train of output pulses, the interval between pulses corresponding generally to the period of said waveform;

a timer adapted to count down from a time less than the period of the lower frequency signal but greater than the period of the higher frequency signal, said timer having a "preset" input;

latch means which when set indicate said first waveform;

first circuit means interconnecting said latch and said timer adapted to clear said latch each time said timer counts down to zero;

second circuit means interconnecting said latch and said detecting circuit output whereby said output pulses set said latch;

third circuit means interconnecting said detecting circuit output and said timer "preset" input; and means for excluding pulses having a time duration of less than a preselected time from setting said latch comprising:

a second latch loaded by said timer when the pulse train from said detector circuit is low and which remembers the previous timer value when said pulse train is high;

an adder connected to the output of said timer and adapted to add to said timer output an amount equal to said preselected timer duration;

and comparator means having a positive input connected to said second latch and a negative input connected to said adder, the output of said comparator means connected to said latch "set" input.

2. The invention in accordance with claim 1 further comprising AND gate means interposed between said comparator output and said latch set, the input to said AND gate comprising the output of said detector circuit.

3. The invention in accordance with claim 2 wherein the output of said AND gate is connected to said timer preset.

4. The invention in accordance with claim 2 further comprising a correlation counter interposed between said latch SET input and said AND gate output, said correlation counter being adapted to be cleared each time said timer counts down to zero.

* * * * *